(12) United States Patent
Asai

(10) Patent No.: US 9,247,094 B2
(45) Date of Patent: Jan. 26, 2016

(54) INFORMATION PROCESSING DEVICE AND INFORMATION PROCESSING SYSTEM FOR EXTRACTING NON-SELECTABLE PRINTING PARAMETERS

(71) Applicant: BROTHER KOGYO KABUSHIKI KAISHA, Nagoya-shi, Aichi-ken (JP)

(72) Inventor: Yasuhiro Asai, Aichi (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/446,984

(22) Filed: Jul. 30, 2014

(65) Prior Publication Data

US 2015/0036185 A1 Feb. 5, 2015

(30) Foreign Application Priority Data

Jul. 31, 2013 (JP) ................................. 2013-159925

(51) Int. Cl.
*G06F 3/12* (2006.01)
*H04N 1/00* (2006.01)

(52) U.S. Cl.
CPC ....... *H04N 1/00973* (2013.01); *H04N 1/00129* (2013.01); *H04N 1/00307* (2013.01); *H04N 1/00413* (2013.01); *H04N 1/00482* (2013.01); H04N 2201/0081 (2013.01); H04N 2201/0094 (2013.01)

(58) Field of Classification Search
CPC .......... H04N 1/00103; H04N 1/00307; H04N 2201/0015; H04N 2201/006; H04N 2201/0094; H04N 1/0013; H04N 1/00127; H04N 1/00413; H04N 1/00482; H04N 1/333; G06F 2200/1637; G06F 3/1204; G06F 3/1253; G06F 3/1255; G06F 3/1285; G06F 3/1292; G06F 3/1297; H04W 4/008; H04B 5/0031
USPC ................................. 358/1.14, 1.15; 455/41.1
See application file for complete search history.

(56) References Cited

U.S. PATENT DOCUMENTS

| | | | |
|---|---|---|---|
| 2002/0089694 A1* | 7/2002 | Idehara | 358/1.15 |
| 2009/0036056 A1 | 2/2009 | Oshima et al. | |
| 2009/0180140 A1* | 7/2009 | Kawamura | 358/1.15 |

(Continued)

FOREIGN PATENT DOCUMENTS

| | | |
|---|---|---|
| JP | 7-143044 A | 6/1995 |
| JP | 2009-037566 A | 2/2009 |

(Continued)

*Primary Examiner* — Benny Q Tieu
*Assistant Examiner* — Juan M Guillermety
(74) *Attorney, Agent, or Firm* — Merchant & Gould PC

(57) ABSTRACT

An information processing device including an image processing unit, a communication unit configured to perform wireless communication with a terminal device within a communicable distance from the terminal device, a display, an input unit, and a controller configured to, after the wireless communication with the terminal device, control the display to display one or more parameters of all parameters available for setting an image processing operation by the image processing unit, the one or more parameters including at least one un-selectable parameter that is not selectable on the terminal device, and in response to receiving, via the input unit, a signal corresponding to a specific parameter of the one or more parameters displayed on the display, control the image processing unit to perform the image processing operation based on the specific parameter corresponding to the received signal.

15 Claims, 15 Drawing Sheets

(56) References Cited

U.S. PATENT DOCUMENTS

| | | | |
|---|---|---|---|
| 2009/0231619 A1* | 9/2009 | Takahashi | 358/1.15 |
| 2009/0316180 A1* | 12/2009 | Nakagawa | 358/1.14 |
| 2010/0321718 A1* | 12/2010 | Mihira | 358/1.14 |
| 2011/0261395 A1* | 10/2011 | Kim et al. | 358/1.15 |
| 2011/0292445 A1 | 12/2011 | Kato | |
| 2012/0158752 A1* | 6/2012 | Chakka | G06F 17/30115 707/752 |
| 2012/0250082 A1* | 10/2012 | Mori | 358/1.15 |
| 2013/0052948 A1* | 2/2013 | Fuchs | 455/41.1 |
| 2013/0208300 A1* | 8/2013 | Sakura | 358/1.14 |
| 2013/0229673 A1* | 9/2013 | Nakayama et al. | 358/1.13 |
| 2013/0329253 A1* | 12/2013 | Sasaki | 358/1.15 |

FOREIGN PATENT DOCUMENTS

| | | |
|---|---|---|
| JP | 2010-147430 A | 7/2010 |
| JP | 2010-241114 A | 10/2010 |

\* cited by examiner

| MOVING DIRECTIONS | INITIAL STATES | | | | 1st DETERMINATION CONDITION | 2nd DETERMINATION CONDITION |
|---|---|---|---|---|---|---|
| | U | D | R | L | | |
| LEFT | ON | OFF | OFF | ON | UP OFF | LEFT OFF |
| | ON | OFF | ON | OFF | RIGHT OFF | LEFT ON |
| | OFF | ON | OFF | ON | DOWN OFF | LEFT OFF |
| | OFF | ON | ON | OFF | RIGHT OFF | LEFT ON |
| RIGHT | ON | OFF | OFF | ON | LEFT OFF | RIGHT ON |
| | ON | OFF | ON | OFF | UP OFF | RIGHT OFF |
| | OFF | ON | OFF | ON | LEFT OFF | RIGHT ON |
| | OFF | ON | ON | OFF | DOWN OFF | RIGHT OFF |
| UP | ON | OFF | OFF | ON | LEFT OFF | UP OFF |
| | ON | OFF | ON | OFF | RIGHT OFF | UP OFF |
| | OFF | ON | OFF | ON | DOWN OFF | UP ON |
| | OFF | ON | ON | OFF | DOWN OFF | UP ON |
| DOWN | ON | OFF | OFF | ON | UP OFF | DOWN ON |
| | ON | OFF | ON | OFF | UP OFF | DOWN ON |
| | OFF | ON | OFF | ON | LEFT OFF | DOWN OFF |
| | OFF | ON | ON | OFF | RIGHT OFF | DOWN OFF |

FIG. 4

| NUMBER OF RECORD | SHEET SIZE | RESOLUTION (dpi) | DOUBLE / SINGLE | Nin1 | I/F |
| --- | --- | --- | --- | --- | --- |
| 1 | A4 | 600 | DOUBLE | 1 | WIRED LAN |
| 2 | A4 | 600 | SINGLE | 2 | WIRELESS LAN |
| 3 | A3 | 600 | DOUBLE | 2 | WIRED LAN |
| 4 | B5 | 600 | SINGLE | 4 | USB |
| 5 | A4 | 300 | DOUBLE | 1 | WIRED LAN |
| 6 | A4 | 900 | DOUBLE | 2 | WIRELESS LAN |
| 7 | A3 | 600 | DOUBLE | 1 | WIRELESS LAN |

FIG. 6

You can change a setting value. Please slide your terminal device in the direction associated with your desired setting value. If you want to maintain the current setting values, please separate your terminal device apart from the NFC I/F without sliding it in any direction.

SHEET SIZE: A3

RESOLUTION: 600 dpi  NO CHANGE  DOUBLE/SINGLE: DOUBLE

You can change a setting value. Please slide your terminal device in the direction associated with your desired setting value. If you want to maintain the current setting values, please separate your terminal device apart from the NFC I/F without sliding it in any direction.

SHEET SIZE: A3   RESOLUTION: 600dpi

N in 1: 2 in 1
DOUBLE/SINGLE: DOUBLE
 NO CHANGE 
SHEET SIZE: A3
DOUBLE/SINGLE: DOUBLE

SHEET SIZE: A3

FIG. 11

INFORMATION PROCESSING DEVICE AND INFORMATION PROCESSING SYSTEM FOR EXTRACTING NON-SELECTABLE PRINTING PARAMETERS

CROSS-REFERENCE TO RELATED APPLICATION

This application claims priority under 35 U.S.C. §119 from Japanese Patent Application No. 2013-159925 filed on Jul. 31, 2013. The entire subject matter of the application is incorporated herein by reference.

BACKGROUND

1. Technical Field

The following description relates to one or more techniques for performing at least one of image processing operations such as an image reading operation of reading an image formed on a document sheet and an image recording operation of recording an image onto a recording medium.

2. Related Art

Application software installed in a mobile terminal device (such as a smartphone) is configured to transmit an operational instruction (parameters) to a plurality of types of devices. However, the application software is required to determine parameters in a state where an intended device to control is not specified. Hence, the application software may be configured to select a parameter from among parameters common to all controllable devices. In the meantime, in order to perform printing with the application software, a user launches the application software on the user's mobile terminal device, then configures print settings, selects image data, and thereafter performs near field communication (hereinafter referred to as "NFC" or "NFC wireless communication") with an intended processing device (e.g., a printer). Then, based on communication information exchanged via the NFC, the user establishes Wi-Fi communication (Wi-Fi® is a trademark registered by Wi-Fi Alliance) between the mobile terminal device and the printer (handover). After that, the user transmits parameters regarding the print settings and the selected image data to the printer via the Wi-Fi communication. It is noted that the parameters regarding the print settings may be transmitted to the printer via the NFC.

SUMMARY

Thus, when using the application software configured to make a selection only from among parameters common to a plurality of processing devices, the user has to select a parameter only from among insufficient options that is less than all optional parameters available for a printer instructed to perform printing. Therefore, it is difficult for the user to properly execute a user-desired operation.

Aspects of the present disclosure are advantageous to provide one or more improved techniques, for an image processing device (an image processing system), which make it possible to achieve an increased number of selectable parameters in at least one of image processing operations (such as an image reading operation and an image recording operation) to be executed by the information processing device in response to an instruction from a mobile terminal device.

According to aspects of the present disclosure, an information processing device is provided, which includes an image processing unit configured to perform an image processing operation, a communication unit configured to perform wireless communication with a terminal device, the wireless communication being established in response to the terminal device being brought within a communicable distance from the communication unit, a display, an input unit, and a controller configured to, after the wireless communication between the communication unit and the terminal device, control the display to display one or more parameters of all parameters available for setting the image processing operation to be performed by the image processing unit, the one or more parameters including at least one un-selectable parameter that is not selectable on the terminal device, and in response to receiving, via the input unit, a signal corresponding to a specific parameter of the one or more parameters displayed on the display, control the image processing unit to perform the image processing operation based on the specific parameter corresponding to the signal received via the input unit.

According to aspects of the present disclosure, further provided is an information processing system that includes an information processing device including an image processing unit configured to perform an image processing operation, a communication unit configured to perform wireless communication with a terminal device, the wireless communication being established in response to the terminal device being brought within a communicable distance from the communication unit, a display, an input unit, and a controller, and a terminal device including a terminal-side communication unit configured to perform the wireless communication with the information processing device, a terminal-side display, a terminal-side input unit, and a terminal-side controller configured to control the terminal-side display to display a plurality of parameters for setting the image processing operation to be performed by the image processing device, and after receiving, from the terminal-side input unit, a signal indicating one or more specific parameters of the plurality of parameters displayed on the terminal-side display, in response to the wireless communication being established between the terminal-side communication unit and the information processing device, control the terminal-side communication unit to transmit information that indicates a request for execution of the image processing operation and displayed-parameter-related information associated with the parameters displayed on the terminal-side display, to the information processing device via the wireless communication, the controller of the information processing device being configured to, in response to receiving the request for execution of the image processing operation and the displayed-parameter-related information via the wireless communication, control the display of the information processing device to display one or more parameters of all parameters available for setting the image processing operation corresponding to the received request, the one or more parameters including at least one parameter other than the parameters associated with the received displayed-parameter-related information.

According to aspects of the present disclosure, further provided is a non-transitory computer-readable medium storing computer-readable instructions that are executable by a processor coupled with an image processing unit configured to perform an image processing operation, a communication unit configured to perform wireless communication with a terminal device, the wireless communication being established in response to the terminal device being brought within a communicable distance from the communication unit, a display, and an input unit, the instructions being configured to, when executed by the processor, cause the processor to, after the wireless communication between the communication unit and the terminal device, control the display to display one or more parameters of all parameters available for setting the image processing operation to be performed by the image processing unit, the one or more parameters including at least one un-selectable parameter that is not selectable on the terminal device, and in response to receiving, via the input unit, a signal corresponding to a specific parameter of the one or more parameters displayed on the display, control the image processing unit to perform the image processing operation based on the specific parameter corresponding to the signal received via the input unit.

According to aspects of the present disclosure, further provided is a non-transitory computer-readable medium storing computer-readable instructions that are executable by a processor coupled with a first communication unit configured to perform first wireless communication with an image processing device configured to perform an image processing operation, the first wireless communication being established in response to the communication unit being brought within a communicable distance from the image processing device, a second communication unit configured to perform second wireless communication with the image processing device, the second wireless communication being configured to achieve a higher communication speed than the first wireless communication, the second wireless communication being established based on specific information unique to the second communication unit and specific information unique to the information processing device, a display, and an input unit, the instructions being configured to, when executed by the processor, cause the processor to control the display to display a plurality of parameters for setting the image processing operation to be performed by the image processing device, and after receiving, from the input unit, a signal indicating one or more specific parameters of parameters displayed on the display, in response to the first wireless communication being established between the first communication unit and the information processing device, control the first communication unit to transmit information that indicates a request for execution of the image processing operation and displayed-parameter-related information associated with the parameters displayed on the terminal-side display, to the information processing device via the first wireless communication, and after receiving, from the input unit, the signal indicating the one or more specific parameters of the parameters displayed on the display, transmit the one or more specific parameters indicated by the signal received from the input unit, to the information processing device via one of the first wireless communication and the second wireless communication.

BRIEF DESCRIPTION OF THE ACCOMPANYING DRAWINGS

FIG. 4 exemplifies a moving direction determination table stored in the MFP in the first illustrative embodiment according to one or more aspects of the present disclosure.

Figure 5A:
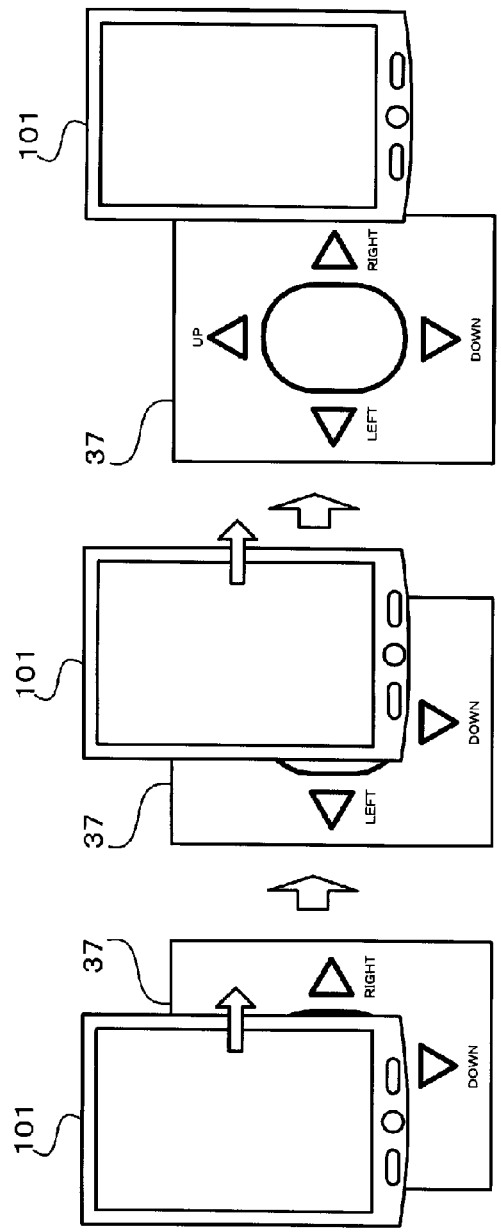
Figure 5B:
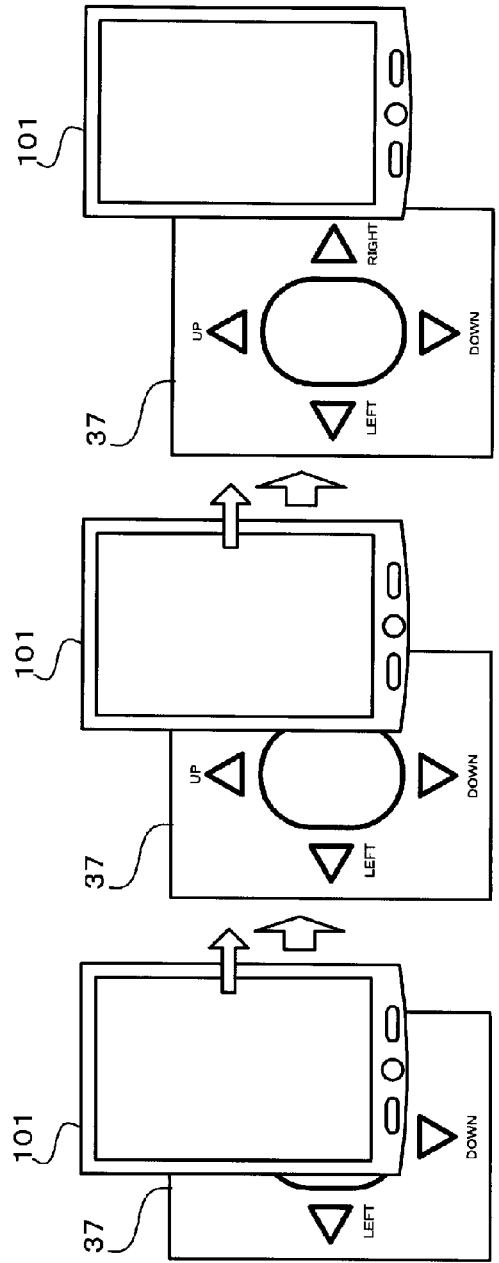

FIGS. 5A and 5B are illustrations for explaining how to determine a moving direction of a mobile device relative to the NFC interface based on the moving direction determination table in the first illustrative embodiment according to one or more aspects of the present disclosure.

FIG. 6 exemplifies records stored in a history storage portion of the MFP in the first illustrative embodiment according to one or more aspects of the present disclosure.

Figure 1:
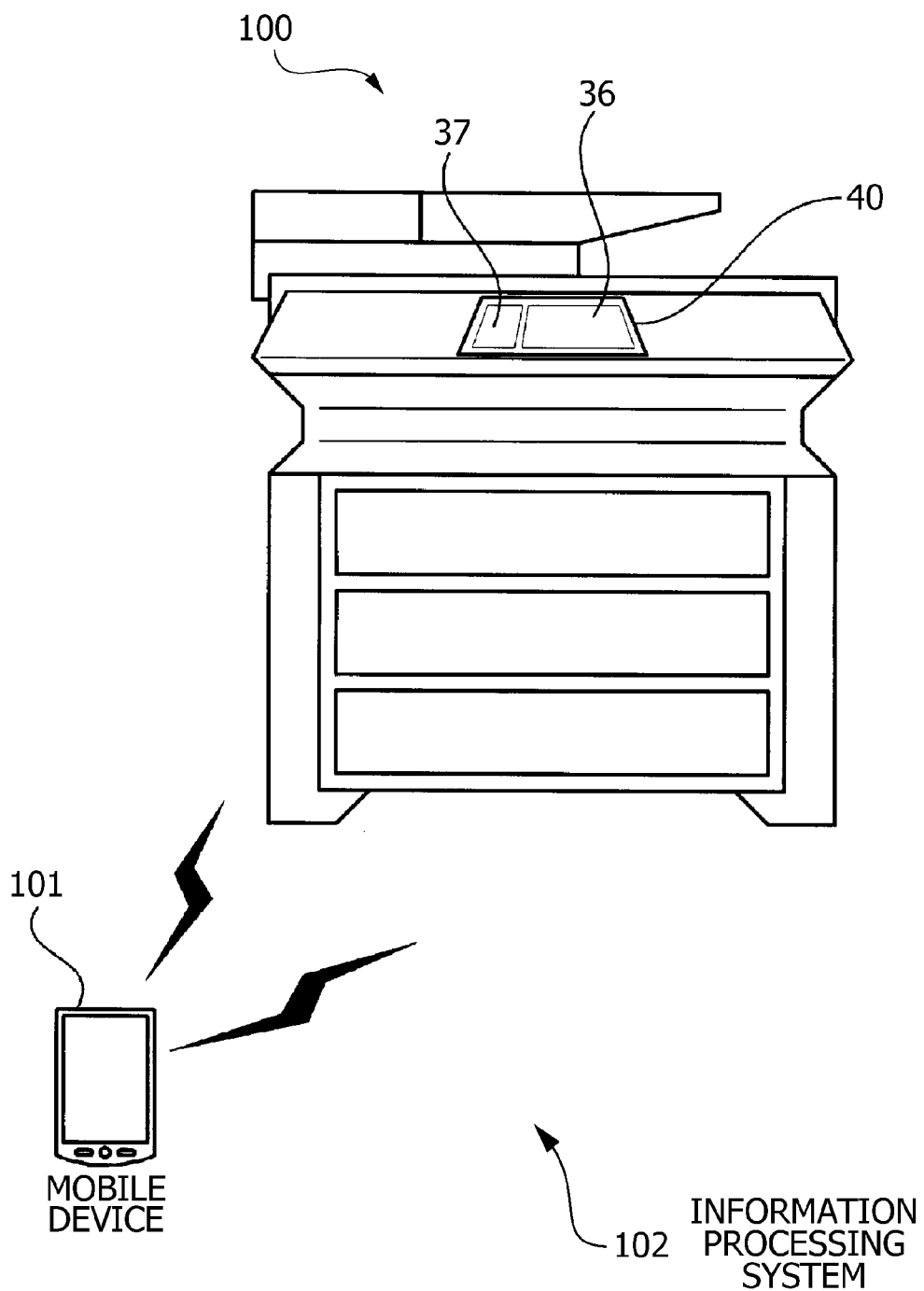
FIG. 1 is an external view of a multi-function peripheral (MFP) in a first illustrative embodiment according to one or more aspects of the present disclosure.
Figure 7:
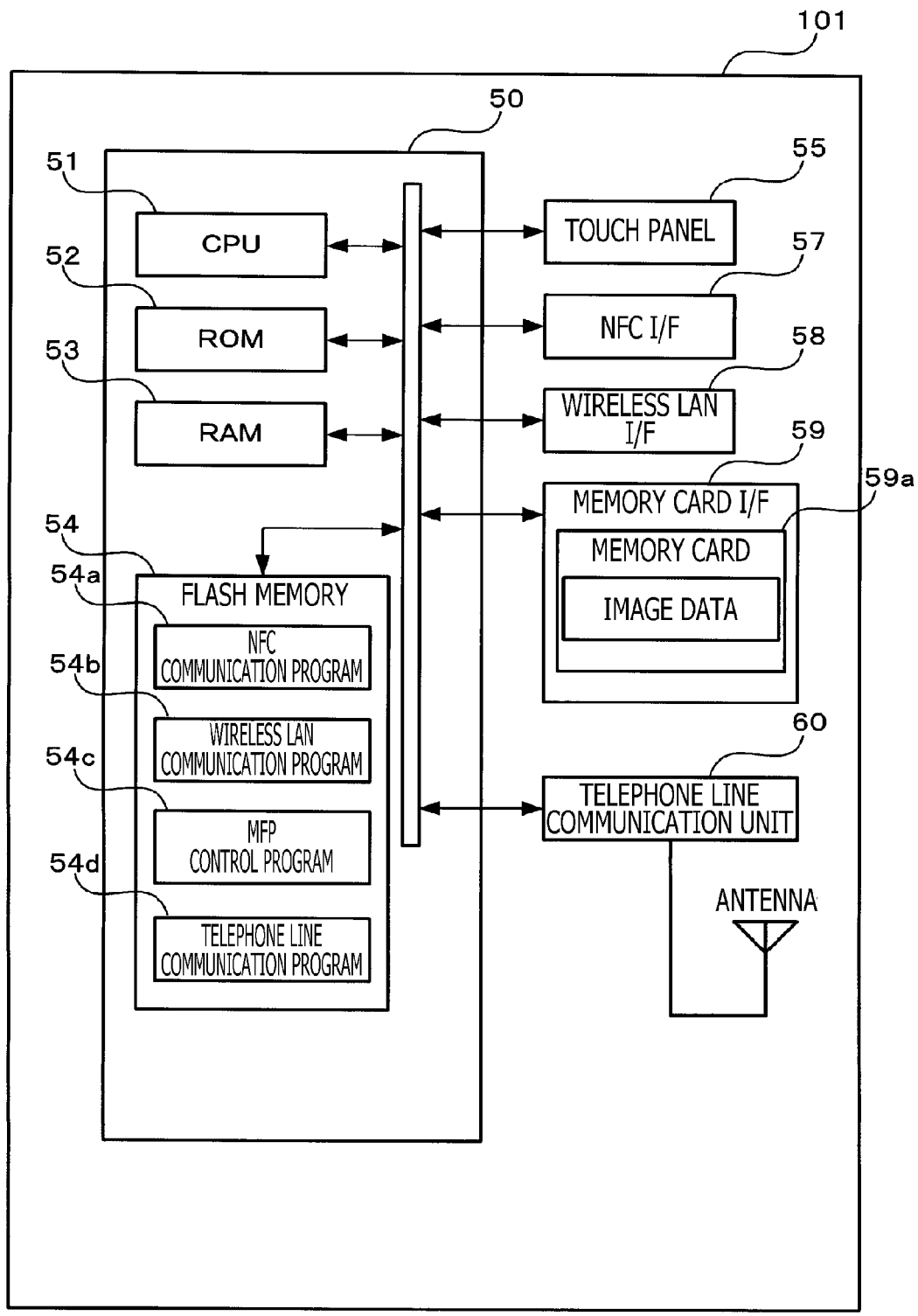

FIG. 7 is a functional block diagram of the mobile device shown in FIG. 1 in the first illustrative embodiment according to one or more aspects of the present disclosure.

Figure 8:
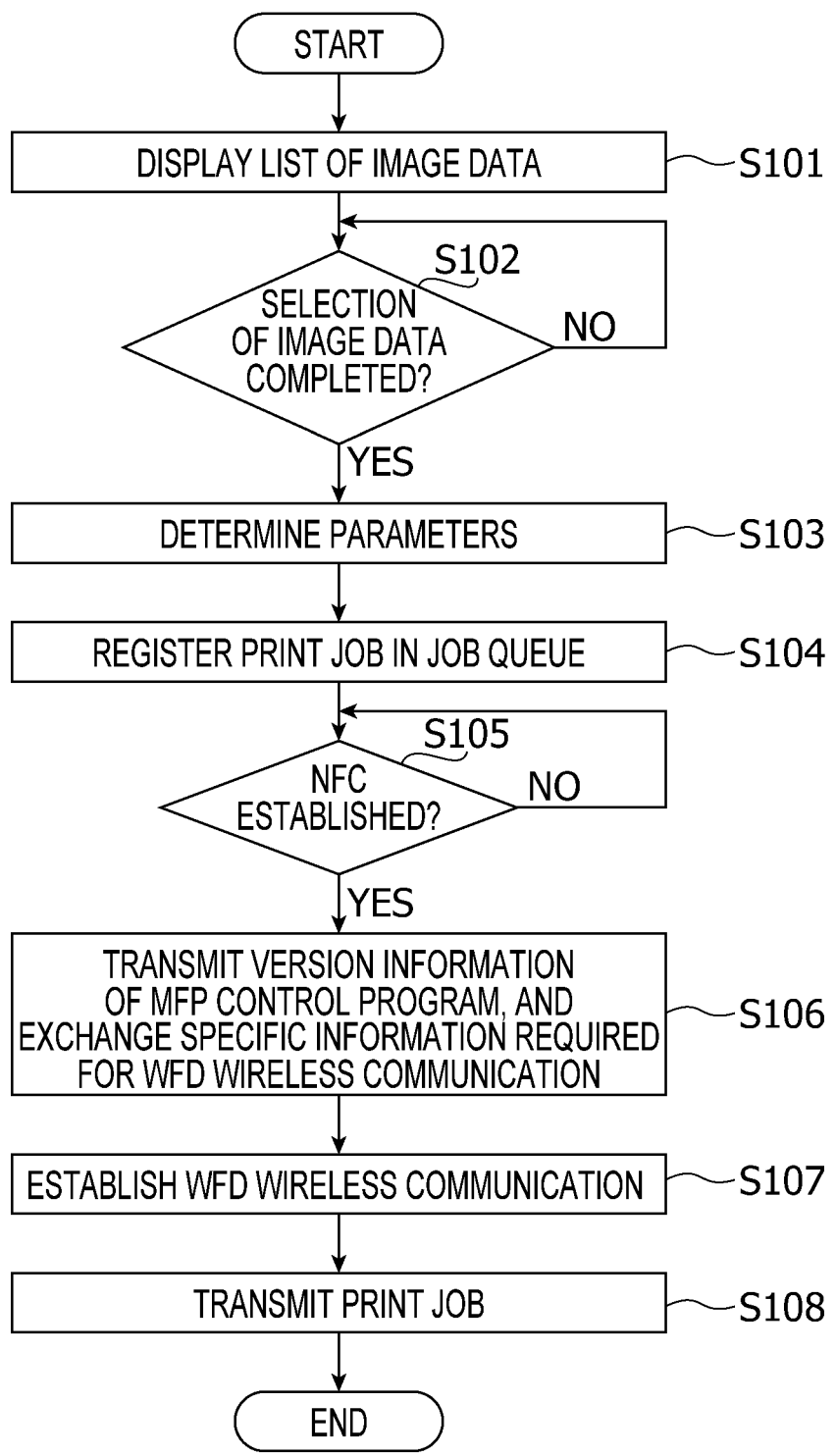

FIG. 8 is a flowchart showing a process to be executed by the mobile device in the first illustrative embodiment according to one or more aspects of the present disclosure.

Figure 9A:
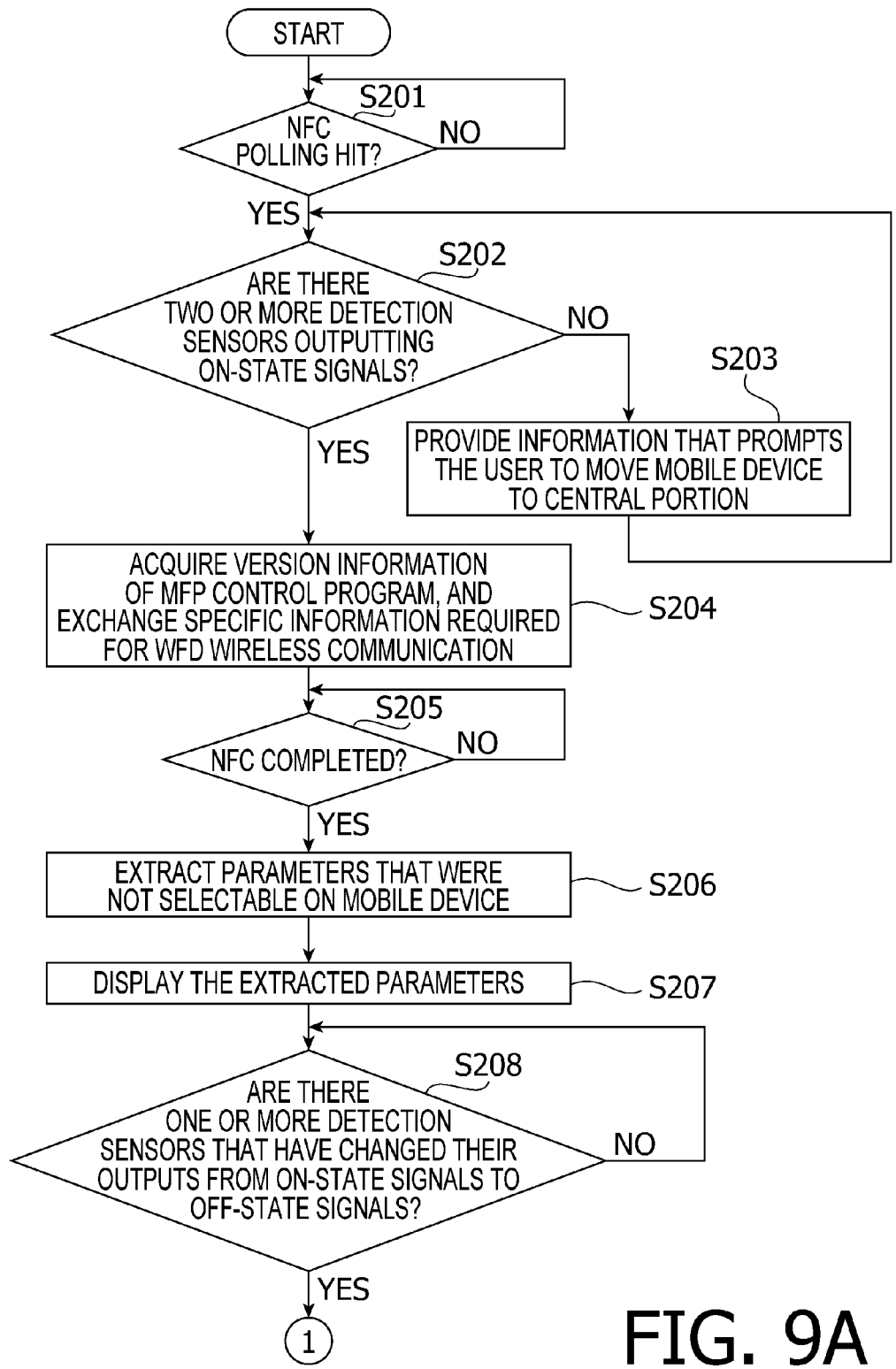
Figure 9B:
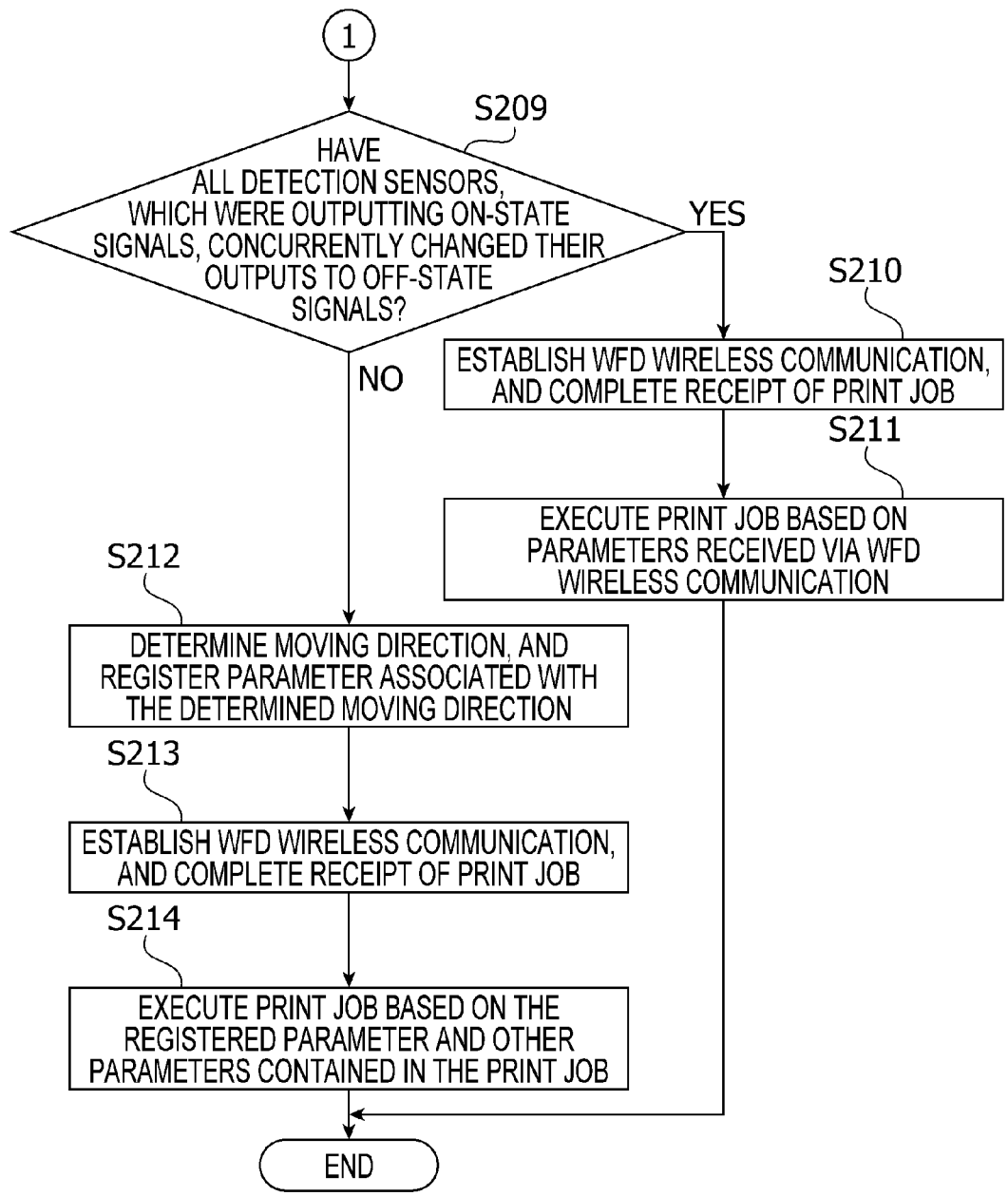

FIGS. 9A and 9B are flowcharts showing a process to be executed by the MFP in the first illustrative embodiment according to one or more aspects of the present disclosure.

FIG. 10 exemplifies information displayed on a touch panel of the MFP in the process shown in FIGS. 9A and 9B in the first illustrative embodiment according to one or more aspects of the present disclosure.

FIG. 11 exemplifies information displayed on the touch panel of the MFP in the process shown in FIGS. 9A and 9B in a modification according to one or more aspects of the present disclosure.

Figure 12A:
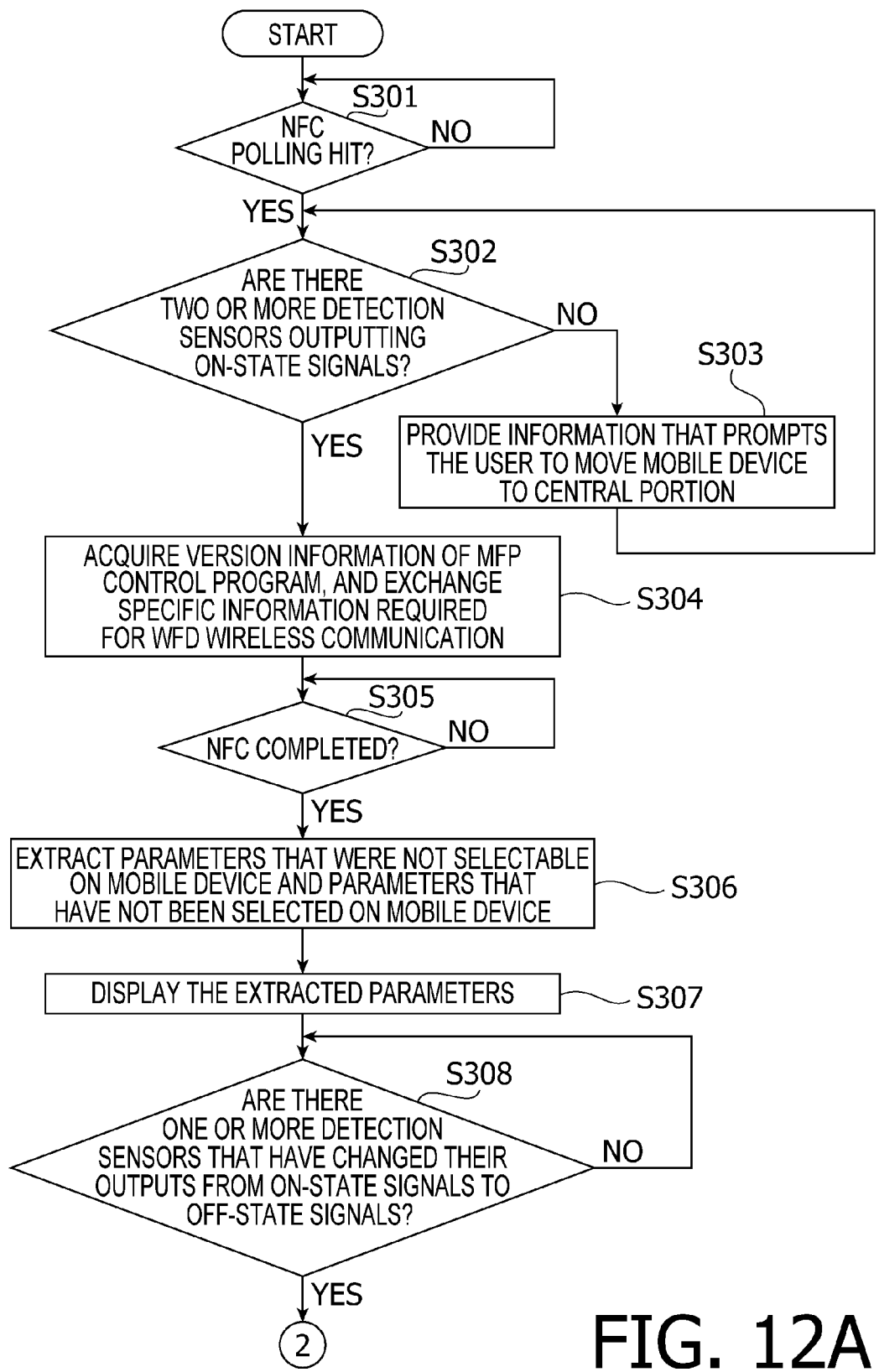
Figure 12B:
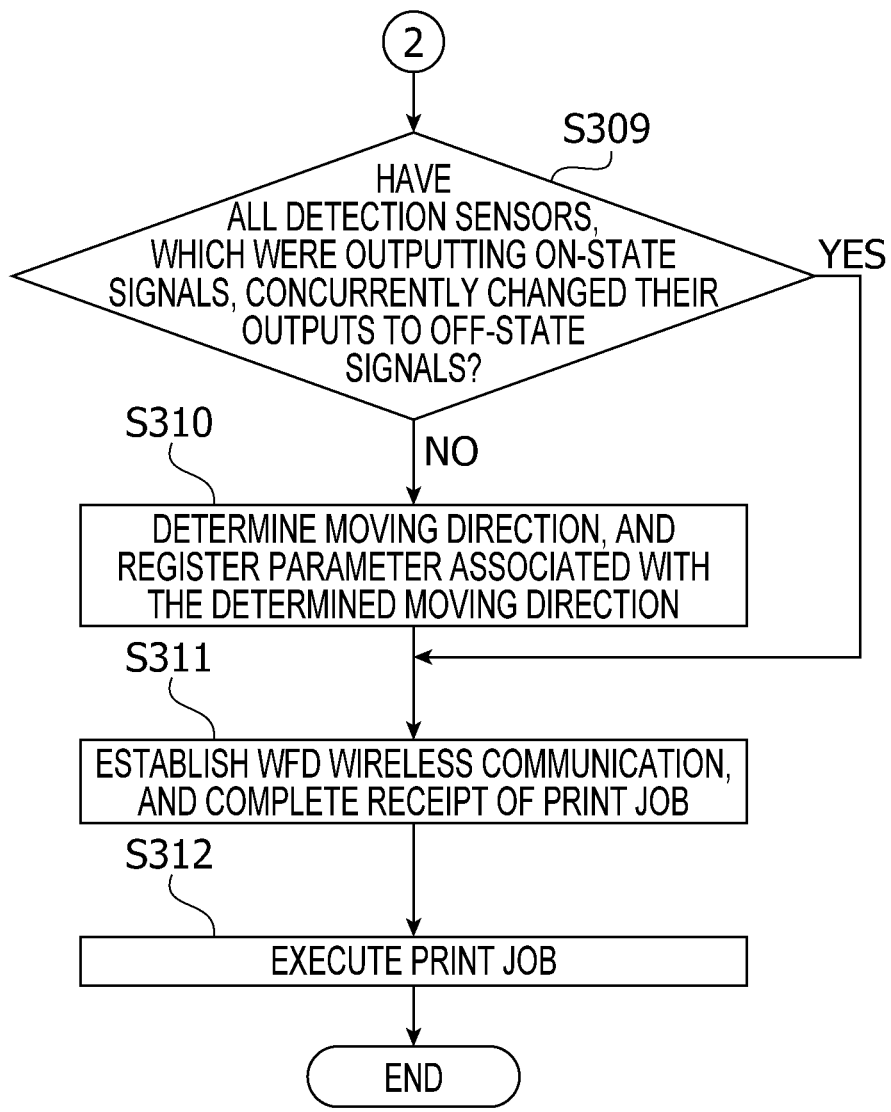

FIGS. 12A and 12B are flowcharts showing a process to be executed by the MFP in a second illustrative embodiment according to one or more aspects of the present disclosure.

Figure 13:
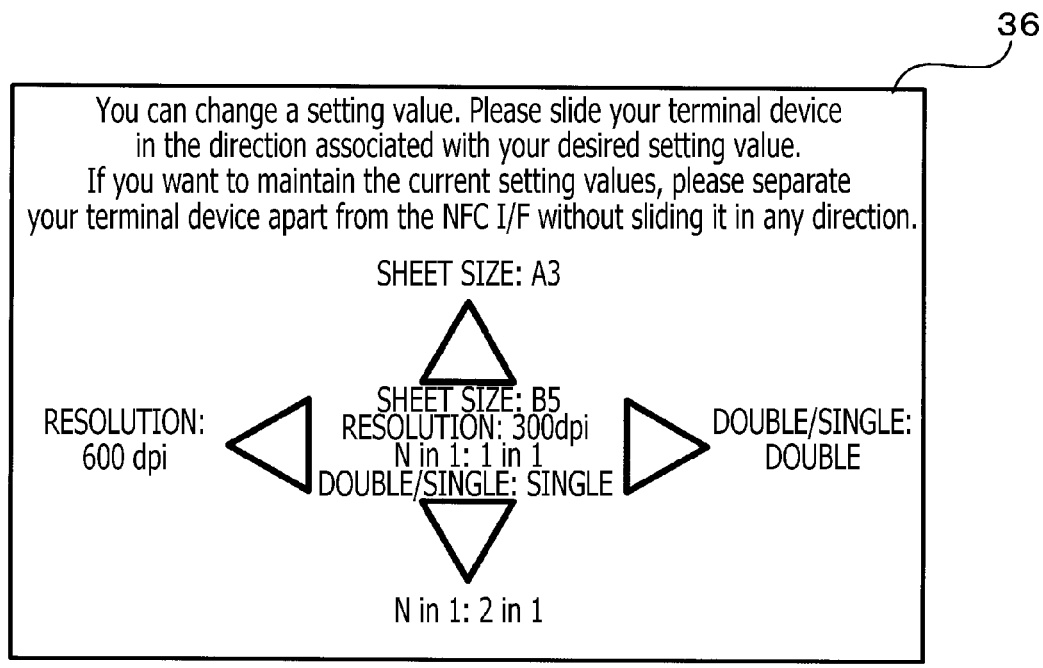

FIG. 13 exemplifies information displayed on the touch panel of the MFP in the process shown in FIGS. 12A and 12B in the second illustrative embodiment according to one or more aspects of the present disclosure.

Figure 14:
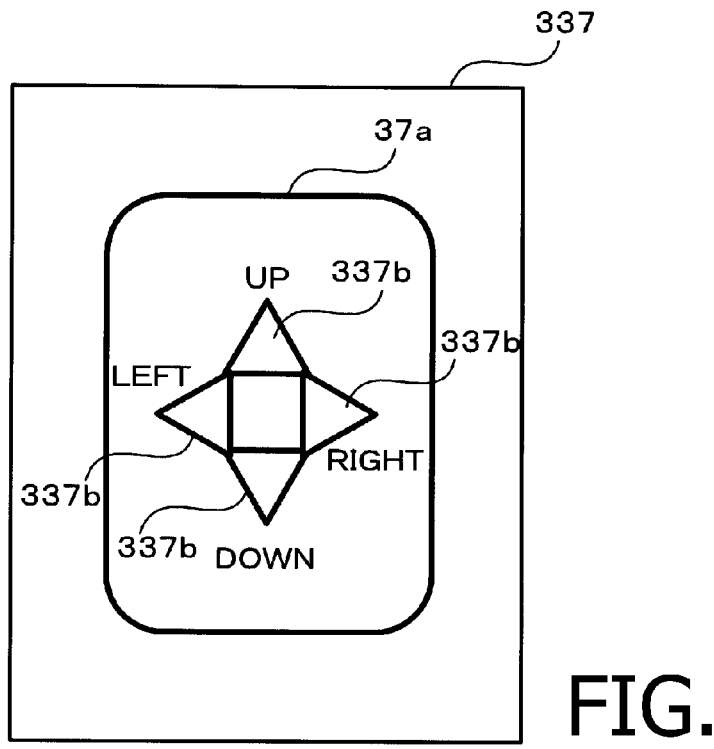

FIG. 14 is a plane view of an NFC interface of the MFP in a modification according to one or more aspects of the present disclosure.

Figure 15:
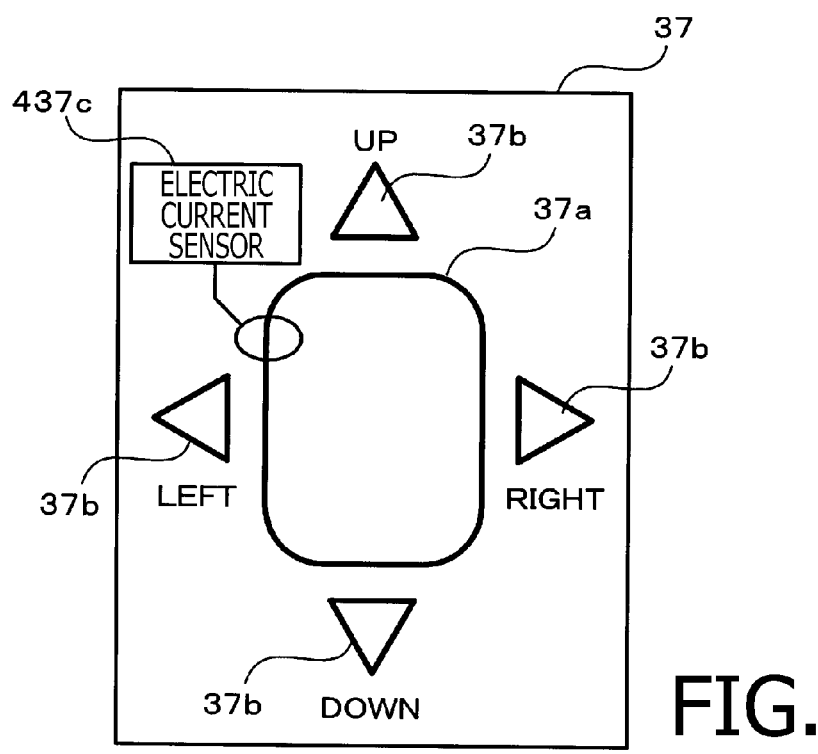

FIG. 15 is a plane view of an NFC interface of the MFP in another modification according to one or more aspects of the present disclosure.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, illustrative embodiments according to aspects of the present disclosure will be described with reference to the accompanying drawings.

First Illustrative Embodiment

In a first illustrative embodiment, aspects of the present disclosure are applied to a multi-function peripheral (MFP) as an information processing device having a scanning function and a printing function. An MFP 100 of the first illustrative embodiment may be configured to perform color printing or may be designed specifically for monochrome printing. Further, the printing function may be implemented in an electrophotographic method or an inkjet method. Moreover, the MFP 100 may employ a charge-coupled device (CCD) or a contact image sensor (CIS) as a reading mechanism.

As shown in FIG. 1, an information processing system 102 includes the MFP 100 and a mobile device 101. The MFP 100 is configured to perform direct data communication with the mobile device 101 via wireless communication (below-mentioned NFC wireless communication and Wi-Fi direct communication). On a front face of the MFP 100, disposed is an operation panel 40. The operation panel 40 includes an NFC interface 37 and a touch panel 36. The NFC interface 37 and the touch panel 36 are arranged side by side in a horizontal direction from left to right in FIG. 1, in a plane parallel to the operation panel 40.

Figure 2:
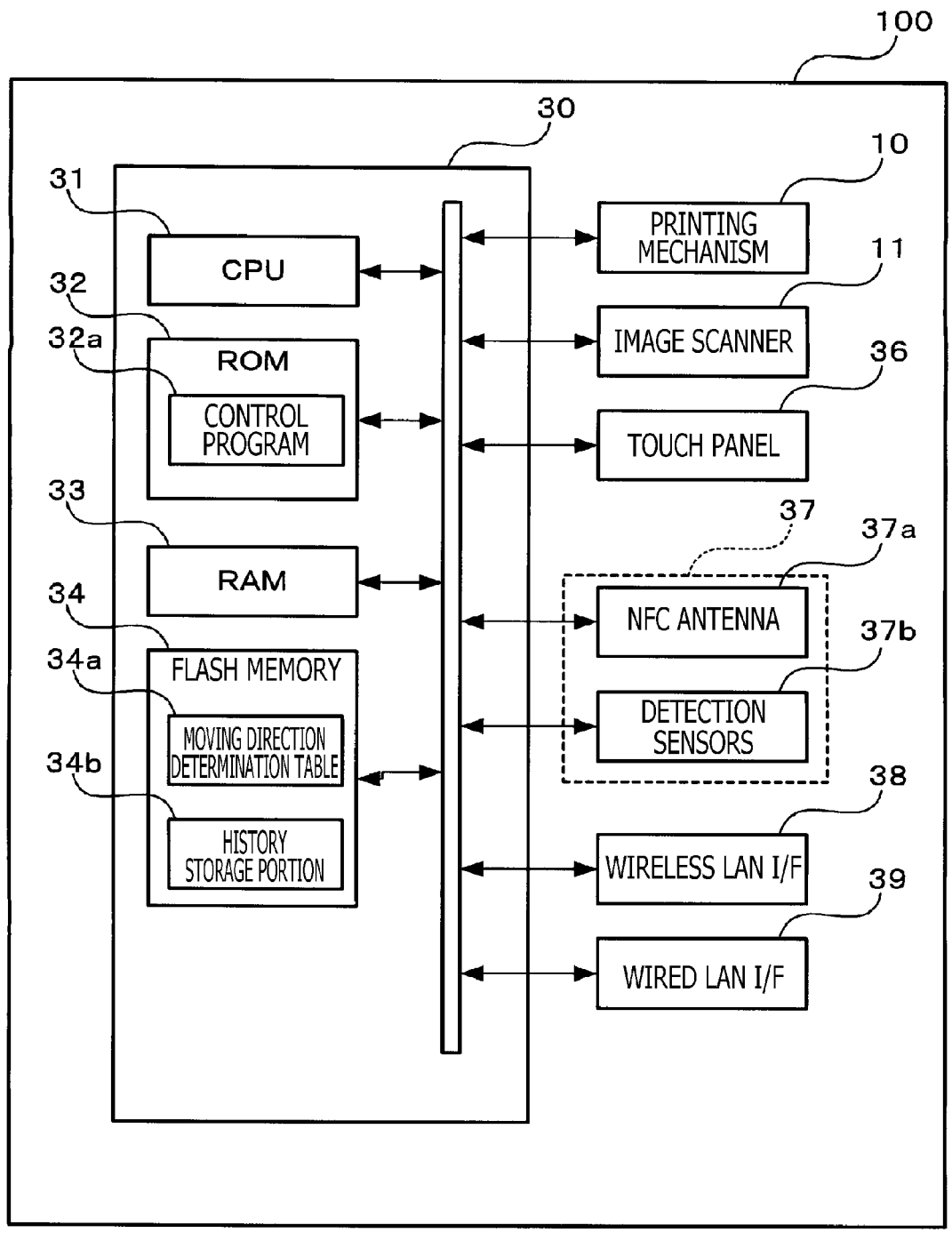
FIG. 2 is a functional block diagram of the MFP in the first illustrative embodiment according to one or more aspects of the present disclosure.

Subsequently, a general configuration of the MFP 100 will be described. As shown in FIG. 2, the MFP 100 is provided with a controller 30 that includes a CPU 31, a ROM 32, a RAM 33, and a flash memory 34. The controller 30 is electrically connected with a print mechanism 10 configured to print an image on a sheet, an image scanner 11 configured to read an image formed on a document sheet, the touch panel 36, the NFC interface 37, a wireless LAN interface 38, and a wired LAN interface 39. It is noted that the print mechanism 10 may be an example of an image recording mechanism. Further, the image scanner 11 may be an example of an image reading mechanism. Hereinafter, a unit or a mechanism that includes at least one of the print mechanism 10 and the image scanner 11 may be referred to as an image processing unit.

The ROM 32 stores a control program 32a (firmware) for controlling the MFP 100, various kinds of settings, and initial values. The RAM 33 and the flash memory 34 are configured to be utilized as work areas into which various control programs are loaded or memory areas to temporarily store data. Additionally, as will be described later, the flash memory 34 stores a moving direction determination table 34a (see FIG. 4) and a history storage portion 34b (see FIG. 6). Further, the flash memory 34 stores specific information (such as an IP address) unique to the MFP 100.

The CPU 31 is configured to take control of each of elements included in the MFP 100 while storing processing results of the control into the RAM 33 or the flash memory 34, in accordance with the control program 32a read out from the ROM 32 and/or signals output from various sensors.

The touch panel 36 is a user interface provided with an input function and a display function. The touch panel 36 is configured to display operating conditions and accept a user input operation.

Figure 3:
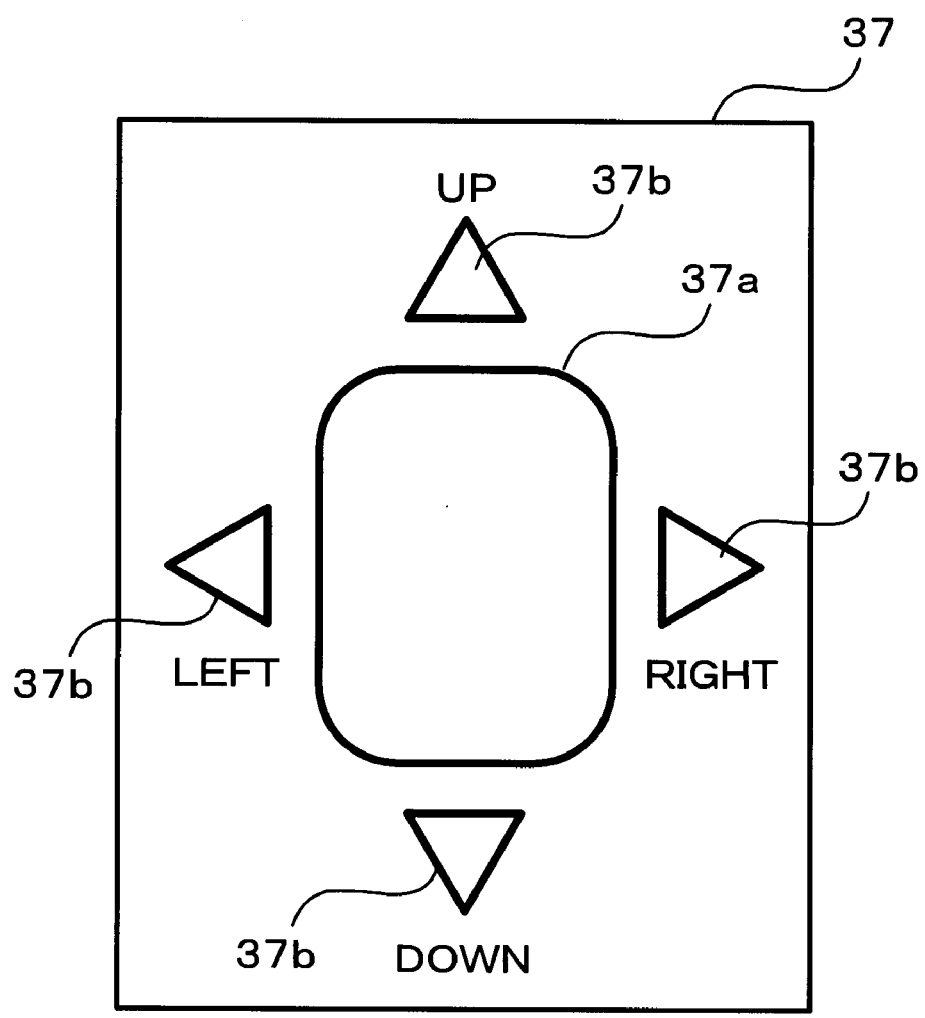
FIG. 3 is a plane view of an NFC (Near Field Communication) interface of the MFP in the first illustrative embodiment according to one or more aspects of the present disclosure.

The NFC interface 37 is an interface configured to perform NFC wireless communication based on international standards of ISO/IEC 21481 or ISO/IEC 18092. As shown in FIG. 3, the NFC interface 42 includes an NFC antenna 37a and four detection sensors 37b. The NFC antenna 37a is a loop antenna that is formed substantially in a rectangular shape and disposed along a flat surface of the operation panel 40 at a central portion of the NFC interface 37. While being powered ON, the MFP 100 is placed in such a state as to detect devices capable of NFC wireless communication, using inquiry signals issued from the NFC interface 37. Therefore, for instance, when the user holds the mobile device 101 over the NFC interface 37, the MFP 100 detects the mobile device 101, and the NFC wireless communication becomes available between the mobile device 101 and the MFP 100. It is noted that "holding the mobile device 101 over the NFC interface 37" is an operation of placing the mobile device 101 within a communicable near field range from the NFC interface 37. At this time, the mobile device 101 is not necessarily required to be brought into contact with the NFC interface 37.

The four detection sensors 37b are disposed at an upside (UP), a downside (DOWN), a left side (LEFT), and a right side (RIGHT) of the NFC antenna 37a, respectively. Each detection sensor 37b is configured to output (transmit) an OFF-state signal when not detecting the mobile device 101 held over the NFC interface 37, and output (transmit) an ON-state signal when detecting the mobile device 101 held over the NFC interface 37. For example, reflection-type optical sensors may be employed as the detection sensors 37b.

The CPU 31 determines a moving direction (UP, DOWN, LEFT, and RIGHT) of the mobile device 101 held over the NFC interface 37 based on initial states of the four detection sensors 37b (UP, DOWN, LEFT, and RIGHT) and determination conditions. The initial states are states of the four detection sensors 37b when the mobile device 101 is held over the NFC interface 37. Further, the determination conditions indicate which detection sensor 37b, of detection sensors 37b that were outputting the ON-state signals in their initial states, has been brought into such a different state as to output the OFF-state signal. Initially, when the number of detection sensors 37b outputting the ON-state signals in their initial states is one or less, the CPU 31 displays on the touch panel 36 information that prompts the user to move the mobile device 101 to the central portion of the NFC interface 37 such that the number of detection sensors 37b outputting the ON-state signals becomes two or more.

When the number of detection sensors 37b outputting the ON-state signals in their initial states is three or more, the CPU 31 determines that the moving direction is opposite to a direction corresponding to a detection sensor 37b that has first been brought into such a different state as to output the OFF-state signal, of detection sensors 37b that were outputting the ON-state signals in their initial states. For instance, the CPU 31 determines that the moving direction is "DOWN" when the signal output from the detection sensor 37b for "UP" has first been changed from the ON-state signal to the OFF-state signal. Further, for instance, the CPU 31 determines that the moving direction is "RIGHT" when the signal output from the detection sensor 37b for "LEFT" has first been changed from the ON-state signal to the OFF-state signal.

When the number of detection sensors 37b outputting the ON-state signals in their initial states is two, the CPU 31 determines the moving direction with reference to the moving direction determination table 34a shown in FIG. 4. As shown in FIG. 4, the moving direction determination table 34a provides information about the association among the initial states of the four detection sensors 37b (UP, DOWN, LEFT, and RIGHT), the determination conditions, and the moving direction (UP, DOWN, LEFT, and RIGHT) determined based on the initial states and the determination conditions. For instance, as shown in FIG. 5A, the CPU 31 determines that the moving direction is "RIGHT" in the following case. The case is when the detection sensors 37b that were outputting the ON-state signals in their initial states are for "UP" and "LEFT," and satisfied are the following two determination conditions, i.e., a first determination condition that firstly, the signal output from the detection sensor 37b for "LEFT" has been changed from the ON-state signal to the OFF-state signal, and a second determination condition that subsequently, the signal output from the detection sensor 37b for "RIGHT" has been changed from the OFF-state signal to the ON-state signal. Further, for instance, as shown in FIG. 5B, the CPU 31 determines that the moving direction is "RIGHT" in the following case. The case is when the detection sensors 37b that were outputting the ON-state signals in their initial states are for "UP" and "RIGHT," and satisfied are the following two determination conditions, i.e., a first determination condition that firstly, the signal output from the detection sensor 37b for "UP" has been changed from the ON-state signal to the OFF-state signal, and a second determination condition that subsequently, the signal output from the detection sensor 37b for "RIGHT" has been changed from the ON-state signal to the OFF-state signal.

The CPU 31 stores parameters selected for an executed print job, into the history storage portion 34b. As shown in FIG. 6, the history storage portion 34b stores numbers of records assigned in order from the last-executed print job, parameters selected for setting items, and data receiving paths (I/F) through which image data regarding each print job has been received. The setting items include a sheet size, a resolution, double-side printing/single-side printing (Double/Single), and the number of pages to be printed on each side of a sheet (N in 1: "N" is a natural number equal to or more than one). It is noted that "USB" recorded for the setting item "I/F" indicates that image data has received from an external device connected with a universal serial bus (USB) interface (not shown). A personal computer (PC) is exemplified as an external device that may transmit image data via the wired LAN interface 39 ("Wired LAN") and the USB interface ("USB"). The PC stores a printer driver, specifically for the MFP 100, which is different from an MFP control program 54c stored in the mobile device 101. The printer driver is configured to allow a user to select any parameter of all parameters settable for the MFP 100.

Referring back to FIG. 2, the wireless LAN interface 38 is configured to perform Wi-Fi Direct wireless communication (hereinafter referred to as "WFD" or "WFD wireless communication") based on IEEE 802.11 standards and other standards complying with IEEE 802.11 standards. The NFC wireless communication and the WFD wireless communication are based on respective different types of standards for wireless communication. The WFD wireless communication is adapted to achieve longer-distance and higher-speed communication than the NFC wireless communication. The MFP 100 performs data communication with external devices via the wireless LAN interface 38. Further, the wireless LAN interface 38 is configured to achieve data communication with various devices coupled with LAN, via the LAN, by Wi-Fi wireless communication. It is noted that the MFP 100 is allowed to perform data communication with various devices coupled with the LAN, via the LAN, with the wired LAN interface 39.

It is noted that the WFD method is a communication method configured to achieve data communication in a network established between a group owner device, which manages the network, and a client device. Therefore, in order to perform data communication with an external device via the wireless LAN interface 38, it is required to establish wireless communication with the external device and create a WFD network. In the first illustrative embodiment, in the WFD network created, the MFP 100 serves as a group owner device, and the mobile device 101 serves as a client device. It is noted that one or more devices other than the mobile device 101 may join the WFD network as client devices. The MFP 100 stores, into the flash memory 34, specific information unique to each individual client device and WFD connection information for establishing the WFD wireless communication with each individual client device. The WFD connection information contains a service set identifier (SSID) for identifying the WFD network, a password, and specific information such as the IP address of the MFP 100.

Subsequently, a general configuration of the mobile device 101 will be described. As shown in FIG. 7, the mobile device 101 is provided with a controller 50 that includes a CPU 51, a ROM 52, a RAM 53, and a flash memory 54. Further, the mobile device 101 includes a touch panel 55, an NFC interface 57, a wireless LAN interface 58, a memory card interface 59, and a telephone line communication unit 60. The touch panel has a display function to display thereon various kinds of information, and an input function to accept user input operations. The NFC interface 57 and the wireless LAN interface 58 are communication interfaces that enable communication with external devices. The memory card interface 59 is configured such that a memory card 59a is detachably attached thereto. The telephone line communication unit 60 is configured to achieve data communication via a wireless public telephone line. The controller 50 is configured to control the above elements included in the mobile device 101. The memory card 59a stores image data owned by the user.

In the same manner as the NFC interface 37 of the MFP 100, the NFC interface 57 is configured to achieve NFC wireless communication. Further, in the same manner as the wireless LAN interface 38 of the MFP 100, the wireless LAN interface 58 is configured to achieve Wi-Fi wireless communication or WFD wireless communication.

In the flash memory 54 of the mobile device 101, incorporated are an OS, a browser configured to access and display files available on the Internet, and device drivers for controlling various devices. Further, the flash memory 54 stores specific information containing an IP address and user personal information concerning the mobile device 101, and various applications that control and operate the mobile device 101. The applications stored in the flash memory 54 includes an NFC communication program 54a, a wireless LAN communication program 54b, an MFP control program 54c, and a telephone line communication program 54d. The NFC communication program 54a is for performing NFC data communication via the NFC interface 57. The wireless LAN communication program 54b is for performing Wi-Fi wireless communication or WFD wireless communication via the wireless LAN interface 58. The MFP control program 54c is for creating a print job that causes the MFP 100 to print image data stored in the mobile device 101. The telephone line communication program 54d is for performing data communication via the public telephone line with the telephone line communication unit 60.

The CPU 51, which executes the MFP control program 54c, creates print data based on imaged data selected by the user as data to be printed. Then, the CPU 51 creates a print job that causes the MFP 100 to print the print data, and registers the print job in a job queue of the mobile device 101.

Further, when a WFD wireless connection has been established based on the specific information, the CPU 51, which executes the MFP control program 54c, is allowed to call for an application programming interface (API) of the wireless LAN communication program 54b, and to transmit the print job from the mobile device 101 to the MFP 100 via the WFD wireless connection.

According to control programs read out from the ROM 52 and/or programs read out from the flash memory 54, the CPU 51 performs various processes while storing computing results of the processes into the RAM 53 or the flash memory 54. Operations of the aforementioned applications are executed by the CPU 51.

Explanations will be provided about operations related to the MFP control program 54c of the mobile device 101, with reference to FIG. 8. As shown in FIG. 8, when launching the MFP control program 54c, the CPU 51 controls the touch panel 55 to display a list of image data stored in the memory card 59a by showing file names or thumbnail-size images of the image data (S101). After determining that image data to be printed has been selected by the user from among the image data listed on the touch panel 55 (S102: Yes), the CPU 51 accepts a parameter determined for each print-related setting item (S103). Specifically, the CPU 51 controls the touch panel 55 to display thereon a plurality of selectable parameters, and accepts a parameter selected by the user from among the plurality of selectable parameters displayed. It is noted that the mobile device 101 does not grasp specifications of the MFP 100 to be controlled, until the mobile device 101 starts communication with the MFP 100. Therefore, at this stage, only highly versatile parameters applicable to general MFPs are selectable. For example, in the first illustrative embodiment, selectable parameters for each setting item on the mobile device 101 are as follows: "A4," "A5," "A6," "B5," and "B6" for the sheet size, "300 (dpi)" for the resolution, "single-side printing" for the double-side printing/single-side printing, and "1" for the number of pages to be printed on each side of a sheet (N in 1: "N" is a natural number equal to or more than one).

The CPU 51 creates print data based on the selected image data, creates a print job that causes a printer to print the print data, and registers the print job in a job queue of the mobile device 101 (S104). Thereby, the mobile device 101 is brought into a state where the mobile device 101 is ready to transmit the print job to the MFP 100. It is noted that the print job contains the parameter selected by the user with respect to each setting item.

When the user holds the mobile device 101 over the NFC interface 37 of the MFP 100 in a state where the print job is registered in the mobile device 101, the MFP 100 detects the mobile device 101 with the NFC antenna 37a. Thereby, the NFC wireless communication is established between the mobile device 101 and the MFP 100. The CPU 51 determines whether the NFC wireless communication has been established (S105). When determining that the NFC wireless communication has not been established (S105: No), the CPU 51 waits for the NFC wireless communication to be established.

When determining that the NFC wireless communication has been established (S105: Yes), the CPU 51 transmits version information of the MFP control program 54c (information on a version of the MFP control program 54c and communicates (exchanges) the specific information required for the WFD wireless communication with the MFP 100, via the NFC wireless communication (S106).

The CPU 51 establishes the WFD wireless communication with the MFP 100 using a handover technology (S107). Then, the CPU 51 transmits the print job registered in the mobile device 101 to the MFP 100 via the WFD wireless communication (S108). Thereafter, the CPU 51 terminates the process shown in FIG. 8.

It is noted that, as will be described later, in the MFP 100, it is possible to change the parameters by moving (sliding) the mobile device 101 in a predetermined direction after the NFC wireless communication with the mobile device 101 is completed.

Subsequently, operations by the MFP 100 will be described with reference to FIGS. 9A and 9B. As shown in FIG. 9A, the CPU 31 controls the NFC interface 37 to transmit an inquiry signal to search for the presence of the mobile device 101 that is ready to perform NFC wireless communication, via the NFC antenna 37a (polling). Then, the CPU 31 determines whether a response signal to the inquiry signal has been received from the mobile device 101 via the NFC antenna 37a (S201: POLLING HIT?). When determining that a response signal has not been received from the mobile device 101 (S201: No), the CPU 31 controls the NFC interface 37 to repeatedly transmit an inquiry signal at intervals of a predetermined time period via the NFC antenna 37a. When determining that a response signal has been received from the mobile device 101 (S201: Yes), the CPU 31 determines whether there are two or more detection sensors 37b that are outputting the ON-state signal (S202). When determining that there are not two or more detection sensors 37b that are outputting the ON-state signal (S202: No), the CPU 31 controls the touch panel 36 to display information that prompts the user to move the mobile device 101 to the central portion of the NFC interface 37 (S203).

When determining that there are two or more detection sensors 37b that are outputting the ON-state signal (S202: Yes), the CPU 31 goes to S204. In S204, the CPU 31 establishes NFC wireless communication with the mobile device 101, and begins to acquire the version information of the MFP control program 54c from the mobile device 101 and to communicate (exchange) the specific information required for the WFD wireless communication, between the MFP 100 and the mobile device 101 (handover). When determining that the NFC wireless communication has been completed (S205: Yes), the CPU 31 goes to S206. In S206, the CPU 31 extracts other parameters (un-selectable parameters), which were not selectable on the mobile device 101 before establishment of the NFC wireless communication (see S103 in FIG. 8), with respect to each setting item, from the version information of the MFP control program 54c as acquired in S204. The MFP control program 54c stores all parameters regarding the MFP 100, every version of the MFP control program 54c, and all selectable parameters for each setting item in association with each version of the MFP control program 54c. Therefore, the CPU 31 extracts the other parameters (un-selectable parameters) for each setting item that were not selectable on the mobile device 101, by determining a difference between all the selectable parameters for each setting item in a current version of the MFP control program 54c and the parameters for each setting item that were selectable on the mobile device 101. In the first illustrative embodiment, the CPU 31 extracts, as the other parameters (un-selectable parameters) for each setting item that were not selectable on the mobile device 101, "A3" and "B4" for the sheet size, "600 (dpi)" and "900 (dpi)" for the resolution, "double-side printing" for the double-side printing/single-side printing, and "2 in 1" and "4 in 1" for the number of pages to be printed on each side of a sheet (N in 1: "N" is a natural number equal to or more than one).

The CPU 31 determines the most frequently used parameter of the previously extracted parameters for each of the aforementioned four setting items with reference to the history storage portion 34b. Then, as shown in FIG. 10, the CPU 31 controls the touch panel 36 to display the determined four parameters in association with the moving directions (UP, DOWN, LEFT, and RIGHT) of the mobile device 101 that is held over the NFC interface 37, respectively (S207). At this time, the CPU 31 controls the touch panel 36 to display information that prompts the user to move (slide) the user's terminal device (the mobile device 101) in a moving direction associated with a user-desired parameter when the user wishes to change the current parameter for a setting item to the user-desired parameter. Additionally, the CPU 31 controls the touch panel 36 to display information that prompts the user to separate the user's terminal device (the mobile device 101) apart from the NFC interface 37 without moving the user's terminal device (the mobile device 101) in any moving direction when the user wishes to maintain the current parameter for each setting item.

The CPU 31 determines whether there are one or more detection sensors 37b, of the four detection sensors 37b, which have changed their outputs from the ON-state signals to the OFF-state signals (S208). When determining that there are not one or more detection sensors 37b that have changed their outputs from the ON-state signals to the OFF-state signals (S208: No), the CPU 31 waits until one or more detection sensors 37b, which were outputting the ON-state signals, have changed their outputs to the OFF-state signals. When determining that there are one or more detection sensors 37b that have changed their outputs from the ON-state signals to the OFF-state signals (S208: Yes), the CPU 31 goes to S209. In S209, the CPU 31 determines whether all the one or more detection sensors 37b, which were outputting the ON-state signals, have concurrently changed their outputs to the OFF-state signals. When determining that all the one or more detection sensors 37b, which were outputting the ON-state signals, have concurrently changed their outputs to the OFF-state signals, i.e., that the mobile device 101 has been separated apart from the NFC interface 37 (S209: Yes), the CPU 31 goes to S210. In S210, the CPU 31 establishes WFD wireless communication with the mobile device 101, and completes receipt of a print job (containing parameters) transmitted by the mobile device 101 via the WFD wireless communication. Then, the CPU 31 executes the print job based on the parameter for each setting item that has been received via the WFD wireless communication (S211). After that, the CPU 31 terminates the process shown in FIGS. 9A and 9B.

When determining that all the one or more detection sensors 37b, which were outputting the ON-state signals, have not concurrently changed their outputs to the OFF-state signals, i.e., that the mobile device 101 has been moved while staying held over the NFC interface 37 (S209: No), the CPU 31 goes to S212. In S212, the CPU 31 determines the moving direction (UP, DOWN, LEFT, and RIGHT) of the mobile device 101, based on the initial states of the four detection sensors 37b and the determination conditions that indicate changes in the outputs from the four detection sensors 37b. Then, the CPU 31 registers a parameter associated with the determined moving direction, for a specific setting item to which the parameter belongs. Subsequently, in S213, the CPU 31 establishes WFD wireless communication with the mobile device 101, and completes receipt of a print job transmitted by the mobile device 101 via the WFD wireless communication. Then, in S214, the CPU 31 executes the print job based on the parameter registered in S212 for the specific setting item corresponding to the registered parameter, and based on parameters contained in the print job received in S213 for setting items other than the specific setting item. After that, the CPU 31 terminates the process shown in FIGS. 9A and 9B.

Although the above descriptions provided explanations about the case where the mobile device 101 controls the print mechanism 10 of the MFP 100, the same procedure for selecting parameters may apply to a case where the mobile device 101 controls the image scanner 11 of the MFP 100. In this case, the MFP 100 may execute a scan job based on determined parameters, and thereafter may transmit image data obtained by execution of the scan job, to the mobile device 101 via WFD wireless communication.

As described above, according to the MFP 100 of the first illustrative embodiment, it is possible to later display a parameter (un-selectable parameter), which was not selectable on the mobile device 101 (before establishment of the NFC wireless communication), with respect to each setting item, and to make a selection from among the displayed parameters. Therefore, it is possible to increase the number of selectable parameters without having to change the MFP control program 54c installed in the mobile device 101. Thereby, the MFP 100 is allowed to properly execute a user-desired operation.

Further, the moving direction of the mobile device 101 is determined based on which detection sensor 37b, of detection sensors 37b that were outputting the ON-state signals in their initial states, has changed its output to the OFF-state signal. Moreover, a parameter assigned to the determined moving direction is registered for a specific setting item corresponding to the parameter. Thus, it is possible to select a parameter by such a simple operation of moving the mobile device 101.

Further, when all the detection sensors 37b, which were outputting the ON-state signals in their initial states, have concurrently changed their outputs to the OFF-state signals, it is determined that the mobile device 101 has been separated apart from the NFC interface 37, and thereafter, a print job is executed based on parameters received via WFD wireless communication. Therefore, it is possible to execute the print job by such a simple operation of separating the mobile device 101 apart from the NFC interface 37 after the NFC wireless communication.

Additionally, based on the history storage portion 34b, it is possible to display the most frequently used parameter, of parameters (un-selectable parameters) that were not selectable on the mobile device 101 (before establishment of the NFC wireless communication), with respect to each setting item, as a selectable parameter on the touch panel 36. Therefore, it is possible to achieve improved user-friendliness of the MFP 100. It is noted that, when it is required to display two parameters for each setting item as selectable parameters on the touch panel 36, the MFP 100 may be configured to display the most frequently used parameter and the second most frequently used parameter for each setting item as selectable parameters on the touch panel 36. Likewise, when it is required to display "n" parameters for each setting item as selectable parameters on the touch panel 36, the MFP 100 may be configured to display "n" parameters from the most frequently used parameter to the n-th most frequently used parameter for each setting item as selectable parameters on the touch panel 36.

Further, parameters (un-selectable parameters) for each setting item that were not selectable on the mobile device 101 are extracted from the version information of the MFP control program 54c transmitted by the mobile device 101, and are displayed on the touch panel 36. Therefore, it is possible to let the user select an appropriate parameter in an efficient manner.

Second Illustrative Embodiment

Subsequently, a second illustrative embodiment according to aspects of the present disclosure will be described with reference to FIGS. 12A, 12B and 13. In the second illustrative embodiment, only a control program of the MFP 100 is different from that in the first illustrative embodiment. Hereinafter, accordingly, operations by the MFP 100 will be described.

As shown in FIG. 12A, the CPU 31 controls the NFC interface 37 to transmit an inquiry signal to search for the presence of the mobile device 101 that is ready to perform NFC wireless communication, via the NFC antenna 37a (polling). Then, the CPU 31 determines whether a response signal to the inquiry signal has been received from the mobile device 101 via the NFC antenna 37a (S301: POLLING HIT?). When determining that a response signal has not been received from the mobile device 101 (S301: No), the CPU 31 controls the NFC interface 37 to repeatedly transmit an inquiry signal at intervals of a predetermined time period via the NFC antenna 37a. When determining that a response signal has been received from the mobile device 101 (S301: Yes), the CPU 31 determines whether there are two or more detection sensors 37b that are outputting the ON-state signal (S302). When determining that there are not two or more detection sensors 37*b* that are outputting the ON-state signal (S302: No), the CPU 31 controls the touch panel 36 to display information that prompts the user to move the mobile device 101 to the central portion of the NFC interface 37 (S303).

When determining that there are two or more detection sensors 37*b* that are outputting the ON-state signal (S302: Yes), the CPU 31 goes to S304. In S304, the CPU 31 establishes NFC wireless communication with the mobile device 101, and begins to acquire from the mobile device 101 the version information of the MFP control program 54*c* and the parameters selected by the user on the mobile device 101, and to communicate (exchange) the specific information required for the WFD wireless communication, between the MFP 100 and the mobile device 101 (handover). When determining that the NFC wireless communication has been completed (S305: Yes), the CPU 31 goes to S306. In S306, the CPU 31 extracts other parameters (un-selectable parameters), which were not selectable on the mobile device 101 (before establishment of the NFC wireless communication), and parameters, which have not been selected by the user on the mobile device 101, with respect to each setting item, from the version information of the MFP control program 54*c* as acquired in S204. The MFP control program 54*c* stores all parameters regarding the MFP 100, every version of the MFP control program 54*c*, and all selectable parameters for each setting item in association with each version of the MFP control program 54*c*. Therefore, the CPU 31 extracts the other parameters (un-selectable parameters) for each setting item that were not selectable on the mobile device 101, by determining a difference between all the selectable parameters for each setting item in a current version of the MFP control program 54*c* and the parameters for each setting item that were selectable on the mobile device 101. In the second illustrative embodiment, the CPU 31 extracts, as the other parameters (un-selectable parameters) for each setting item that were not selectable on the mobile device 101, "A3" and "B4" for the sheet size, "600 (dpi)" and "900 (dpi)" for the resolution, "double-side printing" for the double-side printing/single-side printing, and "2 in 1" and "4 in 1" for the number of pages to be printed on each side of a sheet (N in 1: "N" is a natural number equal to or more than one).

The CPU 31 determines the most frequently used parameter of the previously extracted parameters for each of the aforementioned four setting items with reference to the history storage portion 34*b*. Then, as shown in FIG. 13, the CPU 31 controls the touch panel 36 to display the determined four parameters in association with the moving directions (UP, DOWN, LEFT, and RIGHT) of the mobile device 101 that is held over the NFC interface 37, respectively. At this time, the CPU 31 controls the touch panel 36 to display information that prompts the user to move (slide) the user's terminal device (the mobile device 101) in a moving direction associated with a user-desired parameter when the user wishes to change the current parameter for a setting item to the user-desired parameter. Additionally, the CPU 31 controls the touch panel 36 to display information that prompts the user to separate the user's terminal device (the mobile device 101) apart from the NFC interface 37 without moving the user's terminal device (the mobile device 101) in any moving direction when the user wishes to maintain the current parameter for each setting item (S307). Furthermore, the CPU 31 controls the touch panel 36 to display the parameters selected by the user on the mobile device 101, in a central area surrounded by the indications of the moving directions.

The CPU 31 determines whether one or more detection sensors 37*b* that were outputting the ON-state signals, of the four detection sensors 37*b*, have changed their outputs to the OFF-state signals (S308). When determining that one or more detection sensors 37*b*, which were outputting the ON-state signals, have not changed their outputs to the OFF-state signals (S308: No), the CPU 31 waits until one or more detection sensors 37*b*, which were outputting the ON-state signals, have changed their outputs to the OFF-state signals. When determining that one or more detection sensors 37*b*, which were outputting the ON-state signals, have changed their outputs to the OFF-state signals (S308: Yes), the CPU 31 goes to S309. In S309, the CPU 31 determines whether all the one or more detection sensors 37*b*, which were outputting the ON-state signals, have concurrently changed their outputs to the OFF-state signals.

When determining that all the one or more detection sensors 37*b*, which were outputting the ON-state signals, have not concurrently changed their outputs to the OFF-state signals, i.e., that the mobile device 101 has been moved while staying held over the NFC interface 37 (S309: No), the CPU 31 goes to S310. In S310, the CPU 31 determines the moving direction (UP, DOWN, LEFT, and RIGHT) of the mobile device 101, based on the initial states of the four detection sensors 37*b* and the determination conditions that indicate which detection sensor 37*b*, of the detection sensors 37*b* that were outputting the ON-state signals in their initial states, has changed its output to the OFF-state signal. Then, the CPU 31 registers a parameter assigned to the determined moving direction, for a specific setting item corresponding to the parameter. Subsequently, in S311, the CPU 31 establishes WFD wireless communication with the mobile device 101, and completes receipt of a print job transmitted by the mobile device 101 via the WFD wireless communication. Then, in S312, the CPU 31 executes the print job based on the parameter newly registered in S310 for the specific setting item corresponding to the registered parameter, and based on parameters contained in the print job received in S311 for setting items other than the specific setting item. After that, the CPU 31 terminates the process shown in FIGS. 12A and 12B.

Meanwhile, when determining that all the one or more detection sensors 37*b*, which were outputting the ON-state signals, have concurrently changed their outputs to the OFF-state signals, i.e., that the mobile device 101 has been separated apart from the NFC interface 37 (S309: Yes), the CPU 31 goes to S311 without executing S310. In S311, the CPU 31 establishes WFD wireless communication with the mobile device 101, and completes receipt of a print job transmitted by the mobile device 101 via the WFD wireless communication. Then, in S312, the CPU 31 executes the print job based on the parameter contained in the print job received in S311 for each setting item. After that, the CPU 31 terminates the process shown in FIGS. 12A and 12B.

As described above, according to the MFP 100 of the second illustrative embodiment, it is possible to later display a parameter (un-selectable parameter), which was not selectable on the mobile device 101 (before establishment of the NFC wireless communication), with respect to each setting item, and to make a selection from among the displayed parameters. Therefore, it is possible to increase the number of selectable parameters without having to change the MFP control program 54*c* installed in the mobile device 101. Thereby, the MFP 100 is allowed to properly execute a user-desired operation.

Further, it is possible to make a selection from among not only parameters (un-selectable parameters) that were not selectable on the mobile device 101 but also parameters that have not been selected by the user on the mobile device 101.

Thus, it is possible to reuse parameters that have not been selected by the user on the mobile device 101 as parameters to be set.

Hereinabove, the illustrative embodiments according to aspects of the present disclosure have been described. The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure can be practiced without reapportioning to the details specifically set forth. In other instances, well known processing structures have not been described in detail, in order not to unnecessarily obscure the present disclosure.

Only exemplary illustrative embodiments of the present disclosure and but a few examples of their versatility are shown and described in the present disclosure. It is to be understood that the present disclosure is capable of use in various other combinations and environments and is capable of changes or modifications within the scope of the inventive concept as expressed herein. For instance, according to aspects of the present disclosure, the following modifications are possible.

Modification

In the aforementioned first illustrative embodiment, the MFP 100 is configured to display the most frequently used parameter, of parameters (un-selectable parameters) that were not selectable on the mobile device 101 (before establishment of the NFC wireless communication), for each of the four setting items, on the touch panel 36 in association with a corresponding one of the moving directions of the mobile device 101 (see FIG. 10). Nonetheless, as shown in FIG. 11, at least one of the moving directions may be associated with two parameters each of which is the most frequently used parameter, of parameters (un-selectable parameters) that were not selectable on the mobile device 101, for a corresponding one of two setting items. Thereby, it is possible to achieve further improved user-friendliness of the MFP 100.

In the aforementioned illustrative embodiments, the four detection sensors 37b are disposed at an upside (UP), a downside (DOWN), a left side (LEFT), and a right side (RIGHT) of the NFC antenna 37a, respectively. Nonetheless, the four detection sensors 37b may be disposed in such any positions as to enable determination of the moving direction of the mobile device 101. For instance, as shown in FIG. 14, four detection sensors 337b may be disposed at an upper portion (UP), a lower portion (DOWN), a left portion (LEFT), and a right portion (RIGHT) within a surface area of the NFC antenna 37a. In this case, the four detection sensors 337b output ON-state signals at their initial states. Therefore, an opposite direction of a direction associated with a detection sensor 337b that has changed its output to an OFF-state signal is recognized as a moving direction of the mobile device 101.

In the aforementioned illustrative embodiments, when all detections sensors 37b, which were outputting the ON-state signals, have concurrently changed their outputs to the OFF-state signals, it is determined that the mobile device 101 has been separated apart from the NFC interface 37. Nonetheless, it may be determined that the mobile device 101 has been separated apart from the NFC interface 37, with a different configuration. For instance, as shown in FIG. 15, the controller 30 may further include an electric current sensor 437c configured to detect a current value of an electric current flowing through the NFC antenna 37a. The NFC antenna 37a includes a coil. Hence, each time the mobile device 101 is moved in an in-plane direction of the NFC interface 37 around the NFC antenna 37a, generated is an induced current flowing through the NFC antenna 37a. After the NFC wireless communication, when the CPU 31 has detected an induced current flowing through the NFC antenna 37a based on a result of current value detection by the electric current sensor 437c, if all the detection sensors 37c are outputting the OFF-state signals, the CPU 31 may determine that the mobile device 101 has been separated apart from the NFC interface 37. Thereby, it is possible to certainly detect the state where the mobile device 101 has been separated apart from the NFC interface 37. Alternatively, when the CPU 31 has stopped receiving a response signal to an inquiry signal for searching for the presence of the mobile device 101 that is ready to perform NFC wireless communication, the CPU 31 may determine that the mobile device 101 has been separated apart from the NFC interface 37.

In the aforementioned illustrative embodiments, the MFP 100 is configured to preferentially display more frequently used parameters, of the parameters that were not selectable on the mobile device 101, as selectable parameters on the touch panel 36, based on the history storage portion 34b. Nonetheless, the MFP 100 may be configured to previously display selectable parameters on the touch panel 36 without using the history storage portion 34b. Alternatively, the MFP 100 may be configured to display all parameters for the MFP 100 on the touch panel 36.

In the aforementioned illustrative embodiments, the MFP 100 is configured to select one of parameters associated with the four moving directions. Nonetheless, the number of the moving directions (i.e., the number of selectable parameters or the number of combinations each including a plurality of parameters) may be one, two, three, five, or more.

In the aforementioned illustrative embodiments, the MFP 100 is configured to select a parameter by moving (sliding) relative to and on the NFC interface 37. Nonetheless, the MFP 100 may be configured to accept a direct manual input operation (for selecting a parameter) by the user on the touch panel 36. Alternatively, the MFP 100 may include operable members such as another touch panel and operation buttons (not shown) for selecting a parameter.

The NFC wireless communication exemplified in the aforementioned embodiment is performed using a peer-to-peer (P2P) data exchange technology as standardized by the NFC Forum. Nevertheless, the NFC wireless communication may be performed using NFC tags. In this case, instead of the NFC interface 37, an NFC tag may be connected with the controller 30 of the MFP 100. Further, the NFC tag may be configured to, when read by the mobile terminal device 101, issue a signal indicating that the NFC tag has been read by the mobile terminal device 101. The controller 30 may be configured to, in response to the signal from the NFC tag being put into an ON state, determine the NFC wireless communication has been established.

In the aforementioned illustrative embodiments, aspects of the present disclosure are applied to the MFP 100 having the printing function and the scanning function. Nonetheless, aspects of the present disclosure may be applied to an image scanner alone or various types of printing devices without a scanning function.

What is claimed is:

1. An information processing device comprising:
   an image processing unit configured to perform an image processing operation;

a communication unit configured to perform wireless communication with a terminal device, the wireless communication being established in response to the terminal device being brought within a communicable distance from the communication unit;

a display;

an input unit; and a controller configured to:
- after the wireless communication between the communication unit and the terminal device, extract one or more un-selectable parameters that are not selectable on the terminal device, from all parameters available for setting the image processing operation to be performed by the image processing unit;
- control the display to display one or more parameters of all the parameters available for setting the image processing operation to be performed by the image processing unit, the one or more parameters including at least one of the extracted one or more un-selectable parameters; and
- in response to receiving, via the input unit, a signal corresponding to a specific parameter of the one or more parameters displayed on the display, control the image processing unit to perform the image processing operation based on the specific parameter corresponding to the signal received via the input unit.

2. The information processing device according to claim 1, wherein the communication unit comprises an antenna configured to receive a signal from the terminal device and transmit a signal to the terminal device, via the wireless communication, wherein the information processing device further comprises a panel formed to cover the antenna, the panel being configured to allow the terminal device to be close to the panel when the communication unit performs the wireless communication with the terminal device, wherein the input unit is disposed in a plane parallel to the panel, and comprises a plurality of detection sensors configured to output signals corresponding to a position of the terminal device relative to the panel, and wherein the controller is configured to:
- control the display to display the one or more parameters in association with movable directions of the terminal device along the plane parallel to the panel;
- after the wireless communication between the communication unit and the terminal device, in response to detecting a change in at least one signal of the respective signals output from the plurality of detection sensors, determine one of the movable directions as a moving direction of the terminal device based on the detected change in the at least one signal; and
- determine that a parameter associated with the determined moving direction has been selected as the specific parameter.

3. The information processing device according to claim 2, wherein each of the plurality of detection sensors is configured to output a first-state signal when detecting the terminal device, and output a second-state signal when not detecting the terminal device, wherein at least two of the plurality of detection sensors output the first-state signals during the wireless communication between the communication unit and the terminal device, and wherein the controller is configured to control the image processing unit to perform the image processing operation based on parameters received from the terminal device, when all detection sensors, which were outputting the first-state signals, have concurrently changed output signals from the first-state signals to the second-state signals, after the wireless communication between the communication unit and the terminal device.

4. The information processing device according to claim 2, wherein each of the plurality of detection sensors is configured to output a first-state signal when detecting the terminal device, and output a second-state signal when not detecting the terminal device, wherein the information processing device further comprises an electric current sensor configured to detect a current value of an electric current flowing through the antenna, and wherein the controller is configured to control the image processing unit to perform the image processing operation based on parameters received from the terminal device, in a case where all output signals from the plurality of detection sensors are the second-state signals when the controller detects an induced current flowing through the antenna based on the current value detected by the electric current sensor, after the wireless communication between the communication unit and the terminal device.

5. The information processing device according to claim 1, wherein the communication unit is configured to receive a signal that indicates a parameter selected on the terminal device, from the terminal device via the wireless communication, wherein the controller is configured to control the display to display a parameter that is selectable on the terminal device and is different from the parameter indicated by the signal received by the communication unit, as well as the at least one un-selectable parameter.

6. The information processing device according to claim 1, further comprising a storage configured to store a history of records regarding parameters set for ever-executed image processing operations, wherein the controller is configured to control the display to preferentially display a more frequently used parameter of one or more un-selectable parameter that are not selectable on the terminal device.

7. The information processing device according to claim 1, wherein the controller is configured to determine the at least one un-selectable parameter to be displayed on the display, based on software type information received from the terminal device, the software type information indicating a type of software installed in the terminal device.

8. The information processing device according to claim 7, further comprising a storage configured to store selectable parameters in association with the received software type information, the selectable parameters being selectable on the terminal device, wherein the controller is further configured to extract the one or more un-selectable parameters by subtracting the selectable parameters associated with the software type information from all the parameters available for setting the image processing operation to be performed by the image processing unit.

9. The information processing device according to claim 1, wherein the image processing unit comprises at least one of:
- an image reading mechanism configured to read an image formed on a document sheet; and
- an image recording mechanism configured to record an image onto a recording medium.

10. The information processing device according to claim 1, further comprising a storage configured to store selectable parameters that are selectable on the terminal device,
wherein the controller is further configured to extract the one or more un-selectable parameters by subtracting the selectable parameters from all the parameters available for setting the image processing operation to be performed by the image processing unit.

11. The information processing device according to claim 1,
wherein the controller is further configured to control the image processing unit to perform the image processing operation based on parameters received from the terminal device, when receiving, via the input unit, no signal corresponding to the specific parameter of the one or more parameters after the one or more parameters, including the at least one of the extracted one or more un-selectable parameters, are displayed on the display.

12. The information processing device according to claim 1, further comprising a second communication unit configured to perform second wireless communication with the terminal device, the second wireless communication being configured to achieve a higher communication speed than the wireless communication,
wherein the controller is further configured to control the second communication unit to establish the second wireless communication with the terminal device, after receiving, via the input unit, the signal corresponding to the specific parameter of the one or more parameters displayed on the display.

13. An information processing system comprising:
an information processing device comprising:
  an image processing unit configured to perform an image processing operation;
  a communication unit configured to perform wireless communication with a terminal device, the wireless communication being established in response to the terminal device being brought within a communicable distance from the communication unit;
  a display;
  an input unit; and
  a controller configured to:
    after the wireless communication between the communication unit and the terminal device, extract one or more un-selectable parameters that are not selectable on the terminal device, from all parameters available for setting the image processing operation to be performed by the image processing unit; and
a terminal device comprising:
  a terminal-side communication unit configured to perform the wireless communication with the information processing device;
  a terminal-side display;
  a terminal-side input unit; and
  a terminal-side controller configured to:
    control the terminal-side display to display a plurality of parameters for setting the image processing operation to be performed by the information processing device; and
    after receiving, from the terminal-side input unit, a signal indicating one or more specific parameters of the plurality of parameters displayed on the terminal-side display, in response to the wireless communication being established between the terminal-side communication unit and the information processing device, control the terminal-side communication unit to transmit information that indicates a request for execution of the image processing operation and displayed-parameter-related information associated with the parameters displayed on the terminal-side display, to the information processing device via the wireless communication,
    wherein the controller of the information processing device is configured to, in response to receiving the request for execution of the image processing operation and the displayed-parameter-related information via the wireless communication, control the display of the information processing device to display one or more parameters of all the parameters available for setting the image processing operation corresponding to the received request, the one or more parameters including at least one of the extracted one or more un-selectable parameters other than the parameters associated with the received displayed-parameter-related information; and
    wherein the controller of the information processing device is further configured to, in response to receiving, via the input unit, a signal corresponding to a specific parameter of the one or more parameters displayed on the display, control the image processing unit to perform the image processing operation based on the specific parameter corresponding to the signal received via the input unit.

14. A non-transitory computer-readable medium storing computer-readable instructions that are executable by a processor of the terminal device included in an information processing system according to claim 13, the processor being coupled with:
the terminal-side communication unit configured to perform the wireless communication with the information processing device, the wireless communication being established in response to the terminal-side communication unit being brought within the communicable distance from the information processing device;
a terminal-side second communication unit configured to perform second wireless communication with the information processing device, the second wireless communication being configured to achieve a higher communication speed than the wireless communication, the second wireless communication being established based on specific information unique to the terminal-side second communication unit and specific information unique to the information processing device;
the terminal-side display; and
the terminal-side input unit,
the instructions being configured to, when executed by the processor, cause the processor to:
  control the terminal-side display to display the plurality of parameters for setting the image processing operation to be performed by the information processing device;
  after receiving, from the terminal-side input unit, the signal indicating the one or more specific parameters of the parameters displayed on the display, in response to the wireless communication being established between the terminal-side communication unit and the information processing device, control the terminal-side communication unit to transmit the information that indicates the request for execution of the image processing operation and the displayed-parameter-related information associated with the parameters displayed on the terminal-side display, to the information processing device; and after receiving, from the terminal-side input unit, the signal indicating the one or more specific parameters of the parameters displayed on the display, transmit the one or more specific parameters indicated by the signal received from the terminal-side input unit, to the information processing device via one of the wireless communication and the second wireless communication.

15. A non-transitory computer-readable medium storing computer-readable instructions that are executable by a processor coupled with:
    an image processing unit configured to perform an image processing operation;
    a communication unit configured to perform wireless communication with a terminal device, the wireless communication being established in response to the terminal device being brought within a communicable distance from the communication unit;
    a display; and
    an input unit,
    the instructions being configured to, when executed by the processor, cause the processor to:
        after the wireless communication between the communication unit and the terminal device, extract one or more un-selectable parameters that are not selectable on the terminal device, from all parameters available for setting the image processing operation to be performed by the image processing unit;
        control the display to display one or more parameters of all the parameters available for setting the image processing operation to be performed by the image processing unit, the one or more parameters including at least one of the extracted one or more un-selectable parameters; and
        in response to receiving, via the input unit, a signal corresponding to a specific parameter of the one or more parameters displayed on the display, control the image processing unit to perform the image processing operation based on the specific parameter corresponding to the signal received via the input unit.

* * * * *